United States Patent [19]

Rietveld

[11] 4,029,929
[45] June 14, 1977

[54] ELECTRICAL DISCHARGE MACHINING DEVICE FOR CUTTING WITH WIRE ELECTRODE

[75] Inventor: Frank P. Rietveld, Matthews, N.C.

[73] Assignee: Colt Industries Operating Corporation, New York, N.Y.

[22] Filed: Jan. 27, 1975

[21] Appl. No.: 543,989

[52] U.S. Cl. ......................................... 219/69 W
[51] Int. Cl.² ......................................... B23P 1/08
[58] Field of Search ............ 219/69 V, 69 R, 69 M, 219/69 C, 69 G, 69 E

[56] References Cited

UNITED STATES PATENTS

| | | |
|---|---|---|
| 2,501,954 | 3/1950 | McKechnie et al. ............ 219/69 V |
| 3,830,996 | 8/1974 | Ullmann et al. ................ 219/69 V |
| 3,849,624 | 11/1974 | Dulebohn et al. ............... 219/69 V |

Primary Examiner—Bruce A. Reynolds
Attorney, Agent, or Firm—Harry R. Dumont

[57] ABSTRACT

A system for controlling the cutting of a workpiece with a wire electrode. The system provides for inclining the electrode wire in the path of traversal in opposition to the electrode such that a predetermined incline or taper is given to the workpiece during cutting. This is accomplished with precision control and sizing by providing an eccentric device positioned between a pair of orthogonal rollers, each spaced from opposing surfaces of the workpiece, so that a conical cutting path is described with respect to the electrode wire as it traverses in proximity to the workpiece during cutting.

9 Claims, 4 Drawing Figures

ELECTRICAL DISCHARGE MACHINING DEVICE FOR CUTTING WITH WIRE ELECTRODE

REFERENCE TO RELATED APPLICATIONS

This application is related to the following copending applications, all of common ownership with the present application:

| Serial No. | Filing Date | Title |
|---|---|---|
| 532,200 | 12-12-74 | WIRE ELECTRODE FEED SYSTEM FOR ELECTRICAL DISCHARGE MACHINING<br>Inventor: Frank P. Rietveld |
| 532,199 | 12-12-74 | WIRE ELECTRODE FEED AND CUT-OFF SYSTEM FOR ELECTRICAL DISCHARGE MACHINING<br>Inventor: Frank P. Rietveld |
| 534,291 | 12-19-74 | WIRE ELECTRODE PROTECTION SYSTEM FOR ELECTRICAL DICHARGE MACHINING<br>Inventors: Randall C. Gilleland and Frank P. Rietveld |
| 534,292 | 12-19-74 | ELECTRONIC ALIGNMENT FOR A WIRE ELECTRODE, abandoned<br>Inventors: Randall C. Gilleland and Frank P. Rietveld |
| 551,957 | 2-21-75 | SERVO FEED SYSTEM FOR A WIRE ELECTRODE TYPE ELECTRICAL DISCHARGE MACHINING APPARATUS<br>Inventors: Oliver A. Bell, Jr. and Randall C. Gilleland |
| 555,821 | 3-6-75 | CONSTANT WIRE FEED CONTROL SYSTEM FOR ELECTRICAL DISCHARGE MACHINING<br>Inventors: Oliver A. Bell, Jr. and Randall C. Gilleland |
| 545,929 | 1-31-75 | ELECTRICAL DISCHARGE MACHINING DEVICE FOR TAPER CUTTING WITH WIRE ELECTRODE<br>Inventor: Frank P. Rietveld |
| 567,345 | 4-11-75 | SERVO FEED SYSTEM FOR THROUGH HOLE CUTTING FOR ELECTRICAL DISCHARGE MACHINING APPARATUS<br>Inventors: Oliver A. Bell, Jr. and Randall C. Gilleland |
| 588,060 | 6-18-75 | SERVO FEED SYSTEM FOR THROUGH HOLE MACHINING FOR ELECTRICAL DISCHARGE MACHINING APPARATUS<br>Inventors: Oliver A. Bell, Jr. and Randall C. Gilleland |
| 583,794 | 6-4-75 | PROGRAMMABLE CURRENT CONTROL SYSTEM FOR WIRE ELECTRODE ELECTRICAL DISCHARGE MACHINING APPARATUS<br>Inventors: Oliver A. Bell, Jr. and Randall C. Gilleland |

BACKGROUND OF THE INVENTION

Machining of metallic or other electrically conductive workpieces through electrical discharge machining is known to the prior art. Electrical discharge machining, sometimes hereinafter referred to as "EDM", is accomplished by electrical circuits which typically incorporate a number of electronic output switches that are operated to provide controllable duration machining power pulses across a dielectric coolant filled machining gap. Material is thus removed from the electrically conductive workpiece coincident with the gap dielectric breakdown each time a machining power pulse is passed across the gap. In order to insure predictability and repeatability of machining operation, the power supply circuit generally incorporates a pulsing means or a pulse generator which operates the electronic output switches, turning them on and off at precisely controllable frequencies and at controllable current magnitude. The use of solid state devices, such as transistors, as the electronic output switches is now common. One example of a power supply suitable for use with an electrical discharge machining apparatus is shown and described in Bell U.S. Pat. No. 3,737,615 for "Current and Frequency Control System for Electrical Discharge Machining Apparatus", which is of common ownership herewith.

The electrical discharge machining art has been extended to cover electrical discharge machining of a workpiece through a wire electrode in a known process in which the wire is fed continuously from a supply spool relative to the workpiece, with the electrical discharge machining pulses applied across the gap existing between the workpiece and the wire electrode in the above described manner. This type of electrical discharge machining has enabled the machining of minute and intricate patterns in workpieces with an efficiency and accuracy not known to other metal machining systems. In the more generally used wire electrode electrical discharge machining setups, the workpiece is attached to a table which is positioned in the X and Y axis directions through the operation of incrementally operated electrical motors so that the exact pattern of the cut made in the workpiece may be precisely controlled, for example, through numerical control units used in conjunction with the precision table. One example of this type of wire cutting arrangement is shown in my U.S. patent application Ser. No. 532,200, filed on Dec. 12, 1974, for "Wire Electrode Feed System for Electrical Discharge Machining", which application is of common ownership herewith.

It is important that the wire electrode apparatus and the control system used to position it relative to the workpiece should have the capability of cutting in other than strictly vertical directions through the workpiece. In many EDM work applications, it is important that the workpiece being produced, especially where it is to be used as a die, should have a relief provided. Thus, the capability in the machine tool apparatus of providing this relief, may eliminate any additional machining steps to effect the relief after the workpiece has been cut into the basic die shape. Other arrangements for accomplishing this general purpose, but of less efficient and more complicated nature, are shown, for example, in U.S. Pat. No. 3,849,624 issued to David H.

Dulebohn et al for "Wire Electrode Electric Erosion Device".

BRIEF SUMMARY OF THE INVENTION

The present invention provides a system for electrical discharge machining in which there is provided an apparatus for giving the wire electrode an inclined path relative to the workpiece during cutting so that it is inclined within a vertical plane. In this manner, the automatic provision of a relief in the die, for example, is made without the necessity for a secondary machining operation.

A further advantage arising from the system, according to the present invention, is that the taper control elements are operated and the drive is provided in the preferred embodiment through a pressurized coolant flow in such manner that the coolant serves the purpose of driving the impeller and the associated eccentric device used in the taper determining system for the wire. The coolant is likewise used to wet the wire electrode and is distributed over the wire electrode as it enters the gap. In this manner, dielectric flow is maintained in the best possible manner throughout the cutting gap.

BRIEF DESCRIPTION OF THE DRAWINGS

The various objects, advantages and novel features of the present invention will become apparent from the accompanying detailed description of the invention when considered in conjunction with the accompanying drawings, in which.

DETAILED DESCRIPTION OF THE PREFERRED EMBODIMENT

Figures 1, 2, 3, 4:
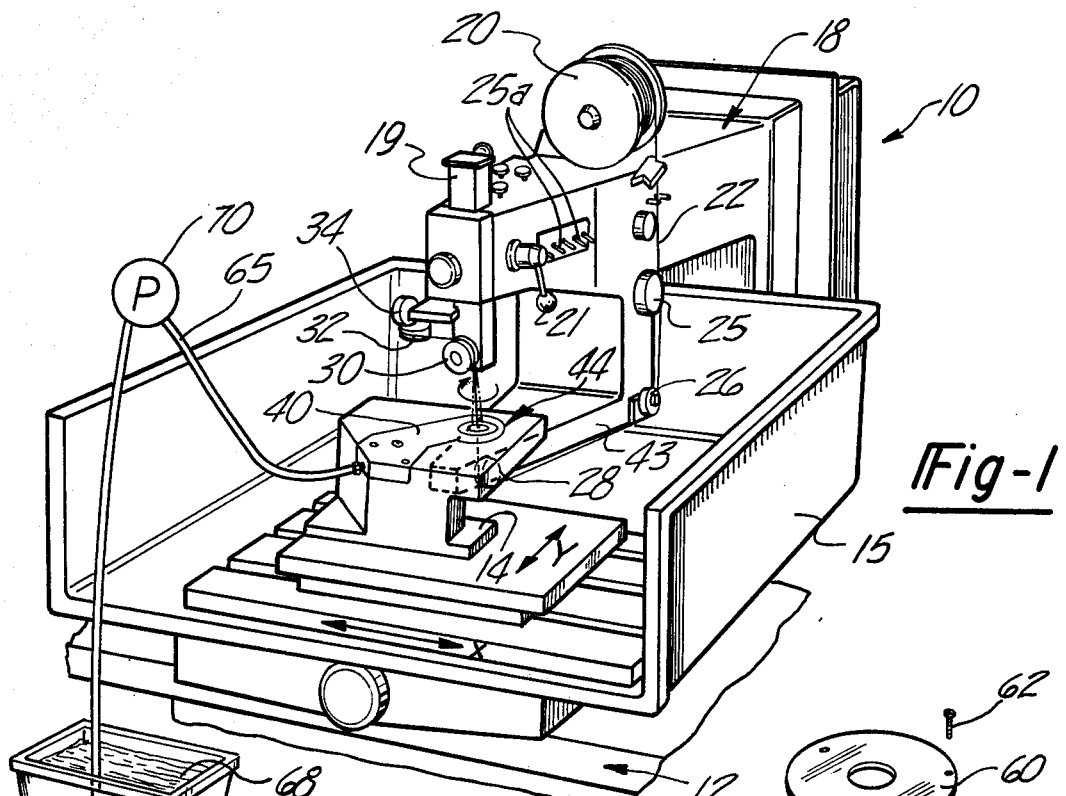
FIG. 1 is a general perspective view with parts broken away showing a machine tool for electrical discharge machining with a wire electrode in which the present invention is incorporated.
FIG. 2 is a side elevational view with parts broken away of the mechanism shown generally in FIG. 1.
FIG. 3 is an exploded perspective view of the system for providing the desired incline or taper of the wire electrode in the cutting zone.
FIG. 4 is a top plan view of the eccentric device with opening provided therethrough which does in fact provide the conical path of the wire electrode as it passes through the cutting zone.

FIG. 1 illustrates a prior art wire electrode electrical discharge machining device basically similar to the one shown and described in my aforementioned patent application Ser. No. 532,199. The machine tool is generally indicated by the numeral 10. The electrical discharge machining power supply that is associated with the machine tool 10 is not shown but is understood to be connected in the manner known to the prior art and as previously described. The power supply may be any of a number of either independent pulse generators or relaxation oscillator type pulse generators as are both well known in the electrical discharge machining art.

The machine tool 10 includes a base 12 which typically has built into it a dielectric reservoir 13 and an associated dielectric temperature control unit for handling the dielectric fluid used in the electrical discharge machining operation. The dielectric fluid itself may be either a supply of deionized water or, alternately, a kerosene or other light viscosity cutting oil. Throughout the EDM cutting operation, it is important that a stream of dielectric coolant be continuously directed and concentrated at the electrode wire and the workpiece to maintain flow through the gap from either the upper, lower or other directions as will be further explained hereinafter in connection with the present invention.

A precision workpiece table 14 is included in the machine tool. The table 14 has a programmable travel table along both the X and Y axes. The system for driving the table 14 generally includes a pair of precision, preloaded ball bearing lead screws (not shown) which are used to eliminate mechanical backlash. A work pan 15, which is either four-sided or three-sided with removable front panel, surrounds the work area to contain the dielectric fluid in the cutting zone and provide for its return to the reservoir 13. The table 14 includes such work holding fixtures which may be required to hold the workpiece in place, which are preferably quick clamping and capable of fastening workpieces of various sizes securely in place. To better illustrate the invention, the FIG. 1 drawing has omitted a showing of the clamps and the workpiece, but the workpiece 11 is shown in position in the FIG. 2 drawing.

The machine tool column is indicated generally by the numeral 18 and includes a height adjustable head 19 which is adjustable through a knob 21 and through an associated precision rack and gear arrangement to bring the wire guide system relatively close to the workpiece 11 to maintain accuracy.

The wire electrode system further includes a supply reel 20 from which is unwound the electrode wire 22. The electrode wire 22, while it is illustrated as being of a wire configuration, may alternately be a band electrode with minor and obvious changes to be made to the configuration of the associated guide and drive rollers. Guide rollers 26, 28, 30, 32 and 34 are included in the system as shown to carry the electrode wire 22 through a predefined cutting path relative to the workpiece 11. The system further includes a variable tension brake 25 with a tension adjust system including switches 25a on the upper part of the machine tool head. A constant tension is maintained on the electrode wire 22 by the brake 25. The brake 25 is of the adjustable torque, permanent magnet type and operation of the switches 25a allows for tension adjustment, for example, in the range of 0.1 to 8.0 ounces by varying the magnetic flux. In the interest of brevity and simplification, the full detail of the brake 25 is not shown.

FIG. 2 shows in greater detail the arrangement of the upper and lower rollers, namely, rollers 30 and 28, which operate to support and guide the wire electrode 22 in the critical cutting zone where it traverses the workpiece 11. Both FIGS. 1 and 2 illustrate the general manner in which the conical path of the electrode wire is initiated. The taper provided in the workpiece is from top to bottom as better shown in FIG. 2. FIG. 2 also shows the assembly 40 which lies on the outward extending arm 42 which forms a part of the work supporting table 44. Alternately, the assembly 40 could be incorporated at the upper surface of the lateral extending arm 43, which arm forms a support for the pin on which the wire guide roller 28 is rotatably mounted.

The parts of the taper providing assembly 40 are shown in spread perspective form in FIG. 3 and will be seen to include a body 46 having a pressurized fluid inlet 48 formed therethrough with an outlet 50 communicating with the interior of a cylindrical chamber 52. The cylindrical chamber 52 is adapted to rotatably support in it a multiple blade impeller 54 which in turn holds a centrally located device 56 having formed therethrough an eccentrically located opening 58. The assembly is completed by an upper cover plate 60 which is fastened in place over the top of the cylindrical chamber 52 through an appropriate number of metal screws 62. The chamber 52 further includes a plurality of openings 64 formed in its lower end. As best shown in FIG. 1, the inlet passage 48 has connected to it an inlet tube 65 having its lower end 66 in communication with a dielectric coolant 68 contained in the dielectric reservoir 13 normally mounted at the bottom of the machine tool 10. A pump 70 is included in the system to provide a pressurized flow of the coolant 68 through the tube 65 into the inlet 48 and thence to provide a driving rotative force by a stream of pressurized fluid against the blades of the impeller 54 therefore to provide the rotative movement of that impeller 54 and of the associated eccentric opening device 56.

The detail of the plug 56 is better shown in FIG. 4. The opening 58 formed in the plug 56 is off-center a predetermined distance D. The degree of eccentricity is thus controlled by the distance D between the opening 58 and the center or axis of rotation of the plug 56. In this manner, the degree of taper imparted to the workpiece 11 can be predetermined by the location of the opening 58. Normally, the relief required for a particular type of die may be of one or two degrees from the vertical or even less. Where the degree of eccentricity needs to be varied, several different prebored plugs 56 can be at hand with the changeover between taper being readily available by removing the press-fitting the particular selected plug 56 in place in the central opening 55 provided in the impeller 54.

It is important to note that in the operation of the taper attachment above described for the wire electrode 22, the fluid force employed to rotate the impeller 54 and the eccentric opening plug 56 utilizes the dielectric coolant 68 in such manner that after it is used to turn the impeller it exits downwardly and accordingly is directed to fall on the electrode 22 along its length below the taper attachment assembly 40. Coolant thus becomes distributed on and about the wire electrode 22 which is traveling upwardly through the cutting zone relative to the workpiece 11. In this manner, the wire electrode 22 becomes continuously sheathed with the coolant 68 just prior to entering the cutting zone so that the stability and uniformity of the electrical discharge machining operation is improved and held constant.

This system thus will be seen to provide a novel and greatly improved wire electrode system in which a predetermined degree of taper is procured on a workpiece, particularly in those operations in which the workpiece is being converted into a die. The taper providing mechanism according to the present invention operates in a highly efficient and proved fashion, while at the same time promoting efficient electrical discharge machining operation in the gap at the same time the taper is being provided.

What is claimed is:

1. A wire cutting type electrical discharge machining tool operable to provide an incrementally controlled movement of a wire electrode relative to a workpiece in a cutting operation, and further operable to provide a tapered cut to said workpiece at the same time, wherein the improvement comprises:

a pair of guide rollers for supporting said wire electrode in a cutting path;

a plug having an eccentric opening formed therein for passing said wire electrode therethrough with a degree of eccentricity having a direct relationship to the degree of taper desired for the workpiece opening;

means for supporting said plug intermediate the pair of guide rollers, each roller located proximate a different outer surface of the workpiece; said rollers vertically displaced, one from the other, and the rotative drive of said plug is provided by a fluid driven impeller, said impeller and said plug both being mounted proximate the lower of said rollers and intermediate it and said upper roller, said impeller being rotatively driven through an impinging stream of fluid, said fluid and said impeller contained in a chamber, said chamber having a plurality of fluid exit holes proximate its lower surface for allowing a plurality of streams of fluid to exit and provide a continuous wetting for the wire electrode traversing therethrough, whereby the efficiency and uniformity of the cutting action of the wire electrode is greatly improved.

2. In an electrical discharge machining apparatus for providing profile cutting in an electrically conductive workpiece by a wire electrode, such wire electrode being traversed relative to the workpiece during machining, a taper control system for controlling the degree of taper during cutting of the workpiece, comprising:

a support arm extending proximate one surface of the workpiece;

a device having an eccentric opening preformed for passage of the wire electrode therethrough and mounted proximate said support arm, said device rotatable at a constant speed during traversal of the wire electrode proximate the workpiece during cutting;

a driving means for said device comprising an impeller rotatably supported in a chamber for providing said rotation to said device;

a fluid directing inlet for rotating said impeller in said chamber; and at least one opening proximate the lower end of said chamber for providing exiting flow of said fluid in such manner as to allow it to continuously sheath and impinge on said wire electrode during its passage proximate the workpiece in the cutting operation.

3. The combination as set forth in claim 2 wherein said device comprises a plug centrally and removably mounted relative to the axis of rotation of said impeller, said plug having its opening preformed with an eccentricity of a like degree to the degree of taper desired in the workpiece.

4. A wire cutting type of electrical discharge machining apparatus operable to provide an incrementally controlled movement of a wire electrode relative to a workpiece in a cutting operation and further operable to provide a tapered cut to said workpiece at the same time, wherein the improvement comprises:

a precision table for supporting said workpiece for incremental movement in the X and Y axes independently;

an upper and a lower guide roller spaced vertically from the workpiece and workpiece table, respectively upward and downwardly; and means for providing an orbital movement of the wire, said means for providing such movement mounted rotatably in the work table for supporting said workpiece and proximate the upper surface of said work table, said means further comprising an eccentric opening plug and means operably connected to said plug for rotatably driving said plug during traversal of the wire between said guide rollers, wherein said means for rotatably driving said device comprises an impeller and a pump for providing a pressurized fluid stream to said impeller; and exit means formed proximate the lower part of the work table for allowing egress of the fluid about the wire electrode before its entry into machining gap relationship to the workpiece.

5. The combination as set forth in claim 4 wherein said fluid comprises an electrical discharge machining coolant used in the EDM operation; and wherein the inlet for said pump providing the pressurized flow is in communication with such coolant contained in the EDM central coolant system.

6. A taper cutting system for use in conjunction with a wire electrode cutting type electrical discharge machining apparatus comprising:
 an incrementally positionable workpiece carrying table;
 an opening formed in said table for traversing the electrode therethrough in proximity to the workpiece during electrical discharge machining cutting;
 means mounted in said table for applying an orbital directional movement to said wire electrode proximate its point of exit from said table opening, including:
 a rotatably driven device, said device having an eccentrically located opening therethrough for passing the wire electrode therethrough, said device mounted in an impeller, said impeller further mounted in a cylindrical chamber formed in said table;
 a pressurized fluid stream is operably connected to said impeller for driving it and said device; and
 a pump is included in the system for providing the pressurized fluid flow to drive said impeller, said pump further having its inlet in communication with an EDM coolant reservoir.

7. The combination as set forth in claim 6 wherein said chamber has at least one exit opening formed at the bottom thereof, said opening substantially aligned with the wire electrode and the lower roller for allowing coolant flow thereabout during traversal of the wire electrode.

8. a taper cutting system for use in conjunction with the wire electrode cutting type electrical discharge machining apparatus comprising:
 a table for providing a movement of the workpiece in at least two different directions;
 and a opening formed in said table for traversing the electrode therethrough in proximity to the workpiece during electrical discharge machining cutting and;
 means mounted and spaced from said table for providing an orbital directional movement to said wire electrode proximate its point of exit from the upper surface of said table opening including a rotatably driven device, said device having an eccentrically located opening therethrough for passing the wire electrode therethrough;
 said rotatably driven device mounted in an impeller, said impeller further mounted in a cylindrical chamber;
 and wherein a pressurized fluid stream is operably connected to said impeller for driving it and said device.

9. The combination as set forth in claim 8 wherein a pump is included in the system for providing the pressurized fluid flow to drive said impeller, said pump further having its inlet in communication with an EDM coolant reservoir.

* * * * *